United States Patent

[11] 3,602,886

[72] Inventors William C. Carter
Ridgefield, Conn.;
Peter R. Schneider, Peekskill, N.Y.
[21] Appl. No. 747,522
[22] Filed July 25, 1968
[45] Patented Aug. 31, 1971
[73] Assignee International Business Machines Corporation
Armonk, N.Y.

[54] SELF-CHECKING ERROR CHECKER FOR PARITY CODED DATA
5 Claims, 5 Drawing Figs.

[52] U.S. Cl. .......... 340/146.1, 235/153
[51] Int. Cl. .......... H03k 13/34, H03k 5/18, H04l 1/10
[50] Field of Search .......... 340/146.1; 235/153

[56] References Cited
UNITED STATES PATENTS

| | | | |
|---|---|---|---|
| 2,848,607 | 8/1958 | Maron | 340/146.1 X |
| 3,439,328 | 4/1969 | Winder | 340/146.1 |
| 3,466,602 | 9/1969 | Moser | 340/146.1 |

OTHER REFERENCES

Grubb, H. R. Fluid Logic Parity Checking. In IBM Technical Disclosure Bulletin. 6(1): p. 27-28. June 1963. TK 7800. I 13

*Primary Examiner*—Malcolm A. Morrison
*Assistant Examiner*—R. Stephen Dildine, Jr.
*Attorneys*—Hanifin and Jancin and Roy R. Schlemmer, Jr.

ABSTRACT: A series of self-checking error checking circuits are disclosed for checking conventional parity coded data lines. The data signal set includes any logical combination of binary "1's" and "0's" and at least one parity bit. The circuit comprises at least 2 exclusive OR tree circuits wherein each tree obtains its inputs from different input lines whereby complementing outputs are produced by the two tree circuits for any correct signal set and wherein the checker is error free. Any error in the data will cause the two outputs to be the same. Malfunctions or failures in the checking circuit are checked by certain legitimate code signals which similarly cause an error representation in the output of the checker.

INVENTORS
WILLIAM C. CARTER
PETER R. SCHNEIDER

BY [signature]

ATTORNEY

FIG. 4

| $X_9$ | $X_7$ | 11 | $X_5$ | 12 | $X_3$ | 13 | $X_1$ | 14 |
|---|---|---|---|---|---|---|---|---|
| 0 | 0 | 0 | 0 | 0 | 0 | 0 | 0 | 0 |
| 0 | 1 | 1 | 0 | 1 | 0 | 1 | 0 | 1 |
| 1 | 0 | 1 | 1 | 0 | 1 | 1 | 1 | 0 |
| 1 | 1 | 0 | 1 | 1 | 1 | 0 | 1 | 1 |

| $X_8$ | $X_6$ | 15 | $X_4$ | 16 | $X_2$ | 17 |
|---|---|---|---|---|---|---|
| 0 | 0 | 0 | 0 | 0 | 0 | 0 |
| 0 | 1 | 1 | 0 | 1 | 0 | 1 |
| 1 | 0 | 1 | 1 | 0 | 1 | 1 |
| 1 | 1 | 0 | 1 | 1 | 1 | 0 |

TABLE FOR FIG. 1

FIG. 5

| $X_9$ | $X_7$ | 11 | $X_5$ | $X_3$ | 12 | 13 | $X_1$ | 14 |
|---|---|---|---|---|---|---|---|---|
| 0 | 0 | 0 | 0 | 0 | 0 | 0 | 0 | 0 |
| 0 | 1 | 1 | 1 | 1 | 0 | 1 | 0 | 1 |
| 1 | 0 | 1 | 0 | 1 | 1 | 0 | 1 | 1 |
| 1 | 1 | 0 | 1 | 0 | 1 | 1 | 1 | 0 |

| $X_8$ | $X_6$ | 15 | $X_4$ | $X_2$ | 16 | 17 |
|---|---|---|---|---|---|---|
| 0 | 0 | 0 | 0 | 0 | 0 | 0 |
| 0 | 1 | 1 | 1 | 1 | 0 | 1 |
| 1 | 0 | 1 | 0 | 1 | 1 | 0 |
| 1 | 1 | 0 | 1 | 0 | 1 | 1 |

TABLE FOR FIG. 2

SELF-CHECKING ERROR CHECKER FOR PARITY CODED DATA

CROSS REFERENCE TO RELATED APPLICATIONS

Reference is hereby made to application Ser. No. 747,533 of W. C. Carter, K. A. Duke and P. R. Schneider filed concurrently herewith and entitled "Self-Checking Checker for Two-Rail Logic Coded Data" and to application Ser. No. 747,665 of W. C. Carter, K. A. Duke and P. R. Schneider entitled "-Self-Checking Checker for *k*-Out-Of-*n* Coded Data" also filed concurrently herewith for a description of two similar types of self-checking checkers. The self-checking checkers of all of these applications have certain characteristics in common and the cross reference to these applications may be helpful for a better understanding of the principles and operation of the present application. They have been filed separately as they relate to different data coding systems.

BACKGROUND OF INVENTION

As present day electronic computers become evermore complex and sophisticated, the numbers of circuits have increased to gigantic proportions with a concurrent reduction in time for performing a given computation. With this large increase in the total numbers of circuits in today's modern complex computing systems, it will be apparent that the number of locations in which an error or fault can occur, has been greatly multiplied. Moreover, if a given faulty component is producing incorrect data, a great many errors or incorrect computations can be produced within a very short space of time until the fault is detected.

In the past many schemes have been proposed for detecting errors in various sections of a computing system. Probably the most wide spread is the use of parity checking wherein an extra bit or bits accompany the transmitted data bits and are utilized to indicate the proper data content of a particular transmission, i.e., normally the parity bit indicates whether an odd or even number of "1's" appears in the data transmission proper. However, for such parity checking systems, means must be provided for detecting and generating the proper parity bits at various transmission points within the computer and additional means must be provided for checking the parity. In the past most checking systems have not themselves been checkable during normal data processing. In other words, if the checker failed so as to indicate an "error free" condition, subsequent errors would obviously go undetected until some other means picked up the system error.

With the increasingly greater load, which must be borne by the customer engineers who have the responsibility of maintaining and repairing computers, any reliable diagnostic circuits built in a computer system are of invaluable aid, both in terms of indicating that an error is present in the system and wherever possible the precise location of the faulty hardware. In the past the provision of large amounts of error detection circuitry has been considered prohibitive in terms of hardware cost. However, with the vastly more complex present day computers and the extreme difficulty in obtaining and training qualified service personnel, the cost disadvantages of reliable diagnostic equipment and circuitry built into the computer is becoming more attractive.

Further, the advent of integrated circuit technology is rapidly reducing the cost of individual circuit blocks to the point where heretofore financially unfeasible hardware installed for the purpose of error detection and correction is beginning to look more attractive.

It will be apparent from the following description of the present invention that the primary concern hereof is the provision of hardware for the detection of errors occurring within a computing system, both function circuits and checking circuits. The particular use made of the error detection information once obtained forms no part of the present invention and accordingly will not be specifically spelled out. However, it will be obvious to one skilled in the art that such information could readily be used for either automatic repair or for merely giving indications to appropriate service personnel for diagnostic and repair purposes.

SUMMARY OF THE INVENTION AND OBJECTS

It has now been found that a self-checking checker can be provided for parity coded data by preferably utilizing at least two single output Exclusive OR logic trees connected to nonoverlapping groups of input data wherein every line is included in one of said groups.

As stated previously, parity coding has long been a popular method of detecting malfunctions in computer systems. The technique consists of adding one binary digit, the check bit, to each binary coded message or word and setting its value such that the parity of "1's" in the message is a constant, i.e., the number of "1's" in all messages is odd or the number of "1's" in all messages is even. A change in value of any single bit in a message will clearly change its parity and will result in changing a code message particularly powerful in situations where the individual bits of a message are generated independently or transmitted over independent paths. Odd parity codes are more commonly used than even parity codes because of the tendency of failures common to every bit to produce an "all zero" result which has even parity and thus is detectable as an error. Odd parity codes will be assumed in the subsequent description or convenience, although the principles of the checkers to be described apply equally to even parity codes.

The self-testing checking circuits proposed by the present invention have two primary characteristics. The checker output distinguishes the presence of code message inputs and error message inputs, i.e., code message inputs produce one set of checker outputs and error message inputs produce a completely different (disjoint) set of checker outputs. For every given failure in the checking circuit there exists at least one code message input which tests for that given failure, i.e., given the failure, when the proper code message is applied the checker will produce an output different from that produced when code messages are applied to a correctly functioning checking circuit. The first characteristic insures that the checking circuit can be used to detect the presence of error messages. The second characteristic insures that the checking circuit is completely self-testing during the normal processing of code messages. Special mechanisms to test for the correct operation of the checking circuitry are eliminated.

These two characteristics require that the checking circuits have more than one output. If only one output existed, the first characteristic would require that the output take on one value, say 1, for code messages and the opposite value, say 0, for error messages. But then the second characteristic could not be satisfied since the checker output could fail in the stuck-at-1 position and application of code messages would never detect this failure. It should be noted that this failure also disables all future error detection ability, thus more than one output is mandatory.

For simplicity of discussion, each checking circuit to be described in detail here will have just two outputs. These two outputs satisfy the first characteristic by becoming either "01" or "10" for code message inputs and either "00" or "11" for error message inputs. Given a failure in the checking circuit, the second characteristic is satisfied by having at least one code message test for this given failure by producing either a "00" or "11" output if the failure exists.

It is accordingly a primary object of the present invention to provide an error checking circuit which is itself testable.

It is a further object to provide such a checking circuit for use to test parity-coded data.

It is yet another object to provide such a checking circuit having at least two different outputs when an error free condition is present.

It is a still further object to provide such a checking circuit which produces a readily discernable output signal whenever an error is detected in the coded data or the checker itself is defective.

It is a further object to provide such a checking circuit constructed of two logic trees wherein the final output of each tree is a single binary function.

It is another object to provide such a checking circuit constructed of conventional logic blocks.

It is another object to provide such a checking circuit wherein the entire checker is constructed of two input, single output Exclusive OR circuits.

The foregoing and other objects, features and advantages of the invention will be apparent from the following more particular description of preferred embodiments of the invention, as illustrated in the accompanying drawings.

DESCRIPTION OF DRAWINGS

FIGS. 4 and 5 comprise tables showing the outputs of the various XOR blocks in FIGS. 1 and 2 respectively.

DESCRIPTION OF THE DISCLOSED EMBODIMENTS

The objects of the present invention are accomplished in general by a self-checking error checker for checking parity coded binary data. The checker includes two or more exclusive OR trees connected to the data lines, said data lines being divided into a like number of nonoverlapping groups, each tree being connected to the data lines of a different group.

In the preferred embodiment two such trees are employed and assuming an error free code and a properly functioning checker, the outputs of the two trees are complements of each other.

In a further embodiment two or more single-output circuits are utilized which are the logical equivalent of the exclusive-OR trees, each of said logic circuits being connected to the lines of a different group of parity coded input data lines.

Hitherto, a parity check circuit consisted of a single output "exclusive-OR" tree. Since the inputs to the tree normally constitute only code messages it is not possible to fully exercise such a tree and in particular the circuit generating the final output is not testable during normal operation. If, however, the input bits are divided arbitrarily into two or more groups (each group containing at least one bit), each group may assume any possible combination of bit values within a code message. Thus, an "exclusive-OR" tree fed by only one such group will be fully exercised by code messages. The checkers described here utilized this principle.

Figures 1, 3:
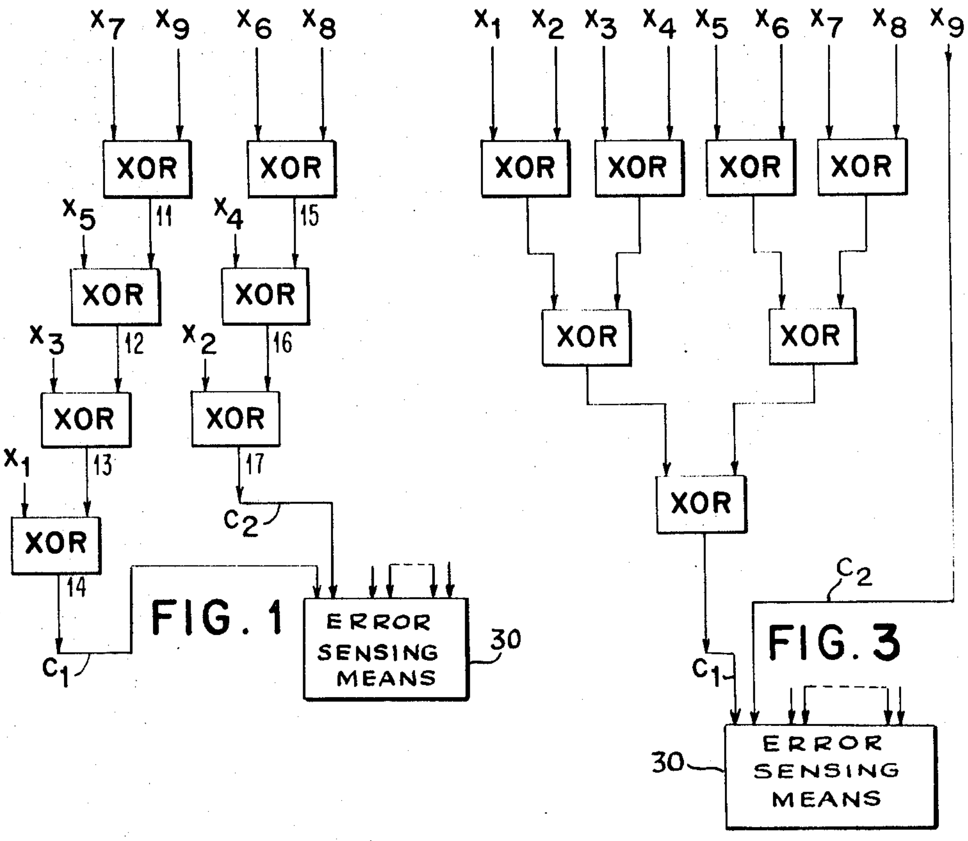
FIG. 1 comprises a logical schematic diagram of a first embodiment of a self-checking error checker constructed in accordance with the teachings of the present invention.
FIG. 3 comprises a logical schematic diagram of a self-checking error checker wherein the parity bit is brought directly out as one of the outputs of the checker circuit.

FIG. 1 illustrates a checker designed to check the parity of a 9-bit message. The message is divided arbitrarily into two groups of bits, group 1 having 5 bits and group 2 having 4 bits. The two groups are used respectively as inputs to a 5-bit and 4-bit exclusive-OR tree. For code messages, if the number of "1's" in group 1 is odd, the number of "1's" in group 2 is even, and vice versa. Since the output of an exclusive-OR tree is "1,"if and only if, the number of "1's" input to it is odd, the outputs of the two trees illustrated in FIG. 1 will be complementary for code messages. If the input is an error message, it will have an even number of "1's" and the parity of groups 1 and 2 will be the same and hence the two outputs of the trees will be identical. Thus, the checker distinguishes between code messages and error messages. Furthermore, since each group can assume any possible combination of bit values within a code message, each tree is fully exercised, and thus fully tested, in normal operation.

Figure 2:
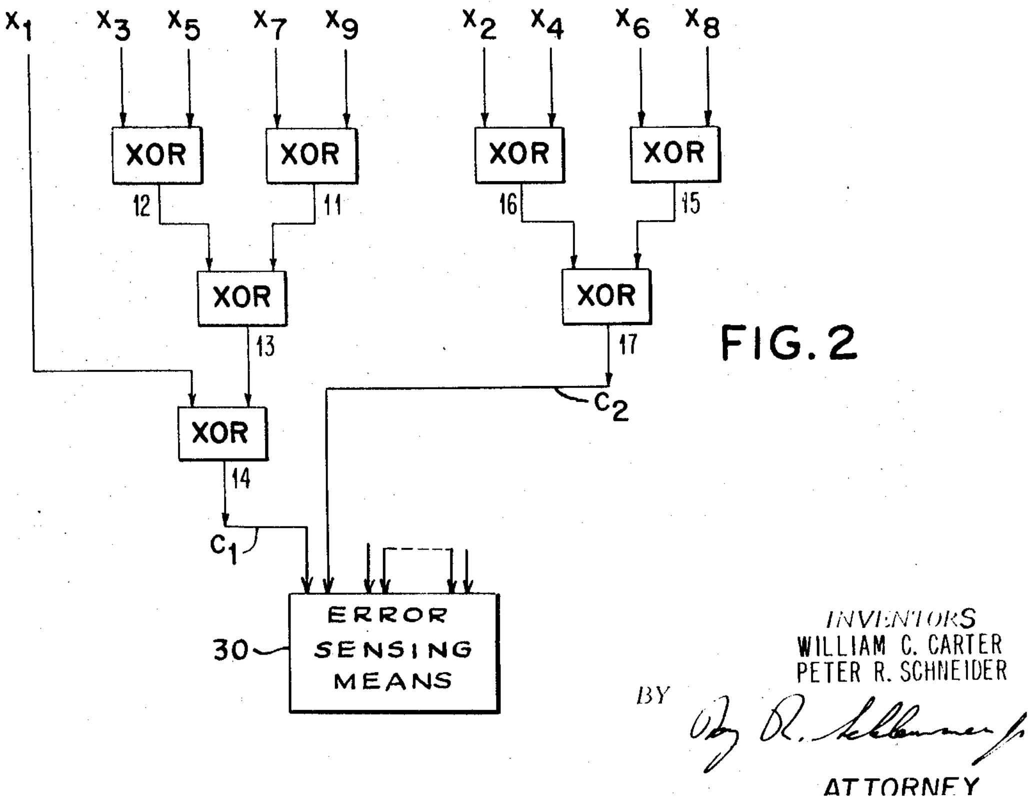
FIG. 2 comprises a logical schematic diagram of another embodiment of a self-checking error checker constructed in accordance with the teachings of the present invention.

In FIG. 2, the exclusive-OR trees have been rearranged to minimize the total delay path through the network. Many variations on these two arrangements are possible also the two groups may be any size provided only that each has at least one bit.

FIG. 3 illustrates the limiting case of a 1-bit group. In this embodiment bit $X_9$ is the only member of the group. The reconfiguring of the logic trees to vary the total delay or numbers of logic levels may be done according to the needs of the particular hardware output being tested. Thus, if the output is from a ripple carry adder, the circuit configuration of FIG. 1 would be used with low order bits entered where the checker delay is greatest and high order bits (the last generated) entered where the delay or number of checker levels is least. This minimizes the checking time.

The tables of FIGS. 4 and 5 show that exactly four code message inputs are all that are necessary to exhaustively check every block in the checking circuits of FIGS. 1 and 2. Only one of many possible sets of four inputs are shown. The check is exhaustive since each XOR sees all possible input patterns when they are applied. When a block fails, an error will appear at its output and immediately propagate to the output of that tree. The numbers in the table refer to the numbered outputs from the XOR's on FIGS. 1 and 2 respectively.

The above description of the three embodiments of FIG. 1–5 describes the underlying concepts of the present invention. It will of course be obvious to one skilled in the art that the above design may be extended to any number of input bits by constructing an appropriate tree of exclusive OR circuits.

Thus, while the invention is extremely straightforward and simple and while it largely resembles a simple parity generating circuit, it is believed that the teachings of the invention represent a heretofore unknown concept in error checking of parity coded data. Thus, the presently disclosed circuit, although quite simple and straightforward, is very powerful in terms of its ability, not only to check for errors in data, but also for its ability to check an error in its own circuitry.

As stated previously, a particular utilization of the outputs of the checker, i.e., $c_1$ and $c_2$ are outside of the scope of this invention as stated in the Background of Invention section previously. However, it should be noted that a plurality of outputs from such checking circuits as disclosed herein could be utilized as inputs to the error checker disclosed in copending application Ser. No. 747,533 of W. C. Carter et al. filed concurrently and entitled "Self-Checking Error Checker for Two-Rail Coded Data." Such an Error Sensing Means is indicated by the block 30 in FIGS. 1, 2 and 3. It should, of course, be understood that some sensing means other than the two-rail error checker disclosed in the above-identified copending application could be used. An alternative means would be a triple modular redundancy circuit having an appropriate voting means connected to the output thereof to render same error tolerant.

While the invention has been particularly shown and described with reference to preferred embodiments thereof, it will be understood by those skilled in the art that various changes in form and details may be made therein without departing from the spirit and scope of the invention.

What is claimed is:

1. A self-testing error checking system for checking parity coded binary data appearing on a set of data lines, said data lines being divided into two distinct nonoverlapping groups, said checking circuit comprising two logic circuit means selectively connected to each group of data lines, each said logic circuit means performing the function of an Exclusive OR logic tree, and means for producing a single binary output from each of said logic circuit means, the two binary outputs from said two logic circuit means having a first predetermined data configuration when the parity coded binary data is correct and the checking circuit is producing no error and having a second predetermined data configuration when a single error is present in either the parity coded data or in the operation of the checking circuit and means connected to said outputs for sensing an error condition, said means possessing the characteristic of tolerating a single failure without producing an error.

2. A self-testing error checking circuit as set forth in claim 1 wherein each of said logic circuit means comprises an Exclusive OR logic tree comprising a plurality of two input single output Exclusive OR circuits.

3. A self-testing error checker as set forth in claim 1 wherein each of said logic circuit means for testing *n* data lines of a particular group is composed of –1 individual Exclusive OR circuits.

4. A self-testing error checking circuit as set forth in claim 1 wherein the data is divided into two groups and two logic circuit means each including an Exclusive OR circuit tree are included in said checker wherein under error free conditions of the input data code and normal operation of the checker the outputs of the two logic circuit means are binary complements of each other.

5. A self-testing error checker as set forth in claim 4 wherein said input data is divided into two groups, each containing *n* and *m* bits wherein each of said logic circuit means includes $n$–1 and $m$–1 individual two input single output Exclusive OR circuits connected respectively to said *n* bit and *m* bit input groups.

PO-1050
(5/69)

UNITED STATES PATENT OFFICE
CERTIFICATE OF CORRECTION

Patent No. 3,602,886 Dated August 31, 1971

Inventor(s) William C. Carter et al

It is certified that error appears in the above-identified patent and that said Letters Patent are hereby corrected as shown below:

Column 5, line 3, cancel "-1" and insert -- n-1 --

Signed and sealed this 22nd day of May 1973.

(SEAL)
Attest:

EDWARD M.FLETCHER,JR.
Attesting Officer

ROBERT GOTTSCHALK
Commissioner of Patents